United States Patent
Godin

(10) Patent No.: US 8,818,374 B2
(45) Date of Patent: Aug. 26, 2014

(54) METHOD OF INTER BASE STATION COMMUNICATION, A BASE STATION AND TELECOMMUNICATION NETWORK

(75) Inventor: Philippe Godin, Nozay (FR)

(73) Assignee: Alcatel Lucent, Boulogne-Billancourt (FR)

(*) Notice: Subject to any disclaimer, the term of this patent is extended or adjusted under 35 U.S.C. 154(b) by 308 days.

(21) Appl. No.: 13/377,688

(22) PCT Filed: Jun. 21, 2010

(86) PCT No.: PCT/EP2010/058724
§ 371 (c)(1),
(2), (4) Date: Dec. 12, 2011

(87) PCT Pub. No.: WO2011/000730
PCT Pub. Date: Jan. 6, 2011

(65) Prior Publication Data
US 2012/0094675 A1 Apr. 19, 2012

(30) Foreign Application Priority Data
Jun. 30, 2009 (EP) .................................. 09290509

(51) Int. Cl.
*H04W 36/00* (2009.01)
(52) U.S. Cl.
USPC ............ 455/436; 455/438; 455/444; 455/453
(58) Field of Classification Search
USPC ................... 455/436, 438, 444, 453; 370/310
See application file for complete search history.

(56) References Cited

U.S. PATENT DOCUMENTS 8,391,194 B2 * 3/2013 Tinnakornsrisuphap et al. ............................ 370/310

FOREIGN PATENT DOCUMENTS

WO WO 2009/067454 A 5/2009

OTHER PUBLICATIONS

"Universal Mobile Telecommunications System (UMTS) Evolved Universal Terrestrial Radio Access (E-UTRA) and Evolved Universal Terrestrial Radio Access Network (E-UTRAN); Overall description; Stage 2 (3GPP TS 36.300 version 8.6.0 Release 8); ETSI TS 136 300," vol. 3-R2, No. V8.6.0, XP014042629, Prague, Czech Republic, Sep. 30-Oct. 3, 2008.
Alcatel-Lucent, Qualcomm Europe, "Further Enhancements of Neighbor Information Exchange over X2," $3^{rd}$ Generation Partnership Project (3GPP), 3GPP TSG-RAN WG3 #61bis, R3-082612, pp. 1-7, XP050323887, Sep. 24, 2008.
Motorola, "Requirements and Evaluation of Options for IP Address Discovery to Support X2 Setup," $3^{rd}$ Generation Partnership Project (3GPP), 3GPP TSG RAN3 #62, R3-082978, pp. 1-3, XP050324221, Prague, Czech Republic, Nov. 10-14, 2008.

(Continued)

Primary Examiner — Temica M Beamer
(74) Attorney, Agent, or Firm — Fay Sharpe LLP

(57) ABSTRACT

The invention relates to a method of inter base station communication comprising: —receiving a first message (118) being indicative of a neighboring second base station (2) by a first base station (1), —sending a second message (120) to the second base station, —in response to the second message, receiving a third message (124) comprising information being indicative of at least a third base station (3), the third base station being a neighbor of the second base station, using the information received with the third message for enabling communication (128) between the first base station and the third base station, independently of any user equipment detection of the third base station.

14 Claims, 2 Drawing Sheets

(56) References Cited

OTHER PUBLICATIONS

Alcatel-Lucent, Qualcomm Europe, "Completion of PCI Allocation," 3$^{rd}$ Generation Partnership Project (3GPP), 3GPP TSG-RAN WG3 #64, R3-091292, pp. 1-2, XP050341644, San Francisco, USA, May 4-8, 2009.

Alcatel-Lucent, "Subsequent X2 Setup Procedure," 3$^{rd}$ Generation Partnership Project (3GPP), 3GPP TSG RAN WG3 Meeting #61bis, R3-082693, pp. 1-5, XP050323961, Prague, Czech Republic, Sep. 30-Oct. 3, 2008.

Mitsubishi electric, "From Large Lists of Potential Neighbour Cells to Self-Optimised Neighbour Cell Lists," 3$^{rd}$ Generation Partnership Project (3GPP), 3GPP TSG SA WG5 and RAN WG3 LTE Adhoc, R3-071239, pp. 1-4, Sophia-Antipolis, France, Jun. 13-14, 2007.

International Search Report for PCT/EP2010/058724 dated Nov. 19, 2010.

* cited by examiner

METHOD OF INTER BASE STATION COMMUNICATION, A BASE STATION AND TELECOMMUNICATION NETWORK

FIELD OF THE INVENTION

The present invention relates to the field of mobile cellular digital telecommunication networks, and more particularly to a method of inter base station communication.

BACKGROUND AND RELATED ART

The technical specification 3GPP TS 36.300 V8.8.0, March 2009, Third Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8) specifies an Automatic Neighbor Relation Function (ANRF) that encompasses the automatic discovery of a neighboring base station. As part of the normal call procedure, the base station (also referred to as node or eNB) instructs each user equipment (UE) to perform measurements on neighbor cells. The base station may use different policies for instructing the user equipment to do measurements and when to report them to the base station. In response to the discovery of a neighbor cell a new X2 interface is set up towards this new base station, if needed. The setup of the X2 interface is performed in accordance with Section 22.3.2 of the above referenced technical specification.

SUMMARY OF INVENTION

The invention provides for a method of inter base station communication comprising receiving a first message being indicative of a neighboring second base station by a first base station, sending a second message to the second base station, in response to the second message, receiving a third message comprising information being indicative of at least a third base station, the third base station being a neighbor of the second base station, using the information received with the third message for enabling communication between the first base station and the third base station.

The invention is particularly advantageous as the communication between the first base station and the third base station is enabled independently of any user equipment detection of the third base station, i.e. without requiring a prior detection of the third base station by a user equipment (UE).

The communication between the first and the third base station can be performed for various purposes, such as the exchange of interference information between the first and third base stations or other data communication.

Embodiments of the invention facilitate the early setup of communication links and robust handovers to newly discovered third base station. This can be accomplished by in response to the third message, sending a fourth message to the third base station to initiate a direct communication link using the information received about that third base station in the third message. Alternatively or in addition in response to the third message an handover is executed towards the third base station over S1 interface using the information received about that third base station in the third message.

Embodiments of the invention are particularly advantageous as the third message that is received from the discovered neighboring second base station is indicative of at least one additional third base station that is neighboring the second base station. The third base station is identified as an additional neighboring base station even though it has not necessarily been discovered by a user equipment. Hence, embodiments of the invention facilitate the use of information regarding neighboring base stations that is present in a newly discovered base station such that the neighbors of the newly discovered base station are identified as additional neighbors of the base station that received the message regarding identification of the first neighboring base station.

In accordance with an embodiment of the invention, the first message is received from a user equipment reporting discovery of the neighboring second base station.

The first message can be generated in accordance with the above referenced technical specification 3GPP TS 36.300, Section 22.3.3, step 1. of the Measurement Procedure.

In accordance with an embodiment of the invention, the second message to the neighboring second base station encompasses a request for initiating establishment of a first communication link, wherein the first communication link is adapted to enable handover communication for performing a handover to the second base station. This is particularly advantageous as the first communication link can be established before a handover request needs to be communicated to the second base station. This ensures that the handover operation can be executed with a minimal latency time such that a failure of a handover can be avoided.

The first communication link can be established using the X2 interface.

In accordance with an embodiment of the invention, the third message carries an internet protocol (IP) address of the third base station. The establishment of the second communication link to the third base station is initiated by sending a fourth message using the received IP address.

If the X2 interface is used the establishment of the second communication link using the IP address of the third base station can be performed in accordance with Section 22.3.2 of the above referenced technical specification 3GPP TS 36.300.

In accordance with an embodiment of the invention, the third message contains the cell identifier third base station and the tracking area code corresponding to one cell of the third base station. The cell identifier (which contains the third base station identity) and the tracking area code are used to obtain the IP address of the third base station. This can be done by querying a database using the cell identifier and the tracking area code as search arguments in order to retrieve the IP address of the third base station. In particular, the IP address of the third base station can be obtained using the cell identifier that includes the third base station identity and the tracking area code third base station over the S1 protocol. (TS36.413 procedure eNB/MME Configuration Transfer) This IP address can then be used to set up the second communication link, e.g. using the X2 interface, with the third base station. This embodiment is particularly advantageous as the retrieval of the IP address that is required for setting up the second communication link is thus performed in advance of any handover request that may then be processed with no delay at a later point of time.

In accordance with a further embodiment of the invention, the cell identifier and the tracking area code received in the third message are simply stored in order to retrieve the IP address and setup the X2 interface later or the IP address is retrieved immediately but the X2 interface is setup later (e.g. at UE detection).

In accordance with a further embodiment of the invention, the cell identifier and the tracking area code received in the third message are simply stored in order to perform a direct handover over S1 without the intermediary of the X2 interface when needed later (e.g. due to a UE detection). Performing the handover processing without the X2 interface has the disadvantage that it is slower but on the other hand the X2 interface does not need to be set up prior to the handover processing.

In accordance with a further embodiment of the invention, the cell identifier and the tracking area code received in the third message are simply stored to enable a combination of the two above-described embodiments.

In another aspect the present invention relates to a computer program product for execution of a method of the invention.

In still another aspect the present invention relates to a base station as claimed. as In still another aspect the present invention relates to a telecommunication network comprising a plurality of base stations of the invention.

BRIEF DESCRIPTION OF THE DRAWINGS

In the following embodiments of the invention are described, by way of example only, making reference to the drawings in which.

DETAILED DESCRIPTION

Figure 1:
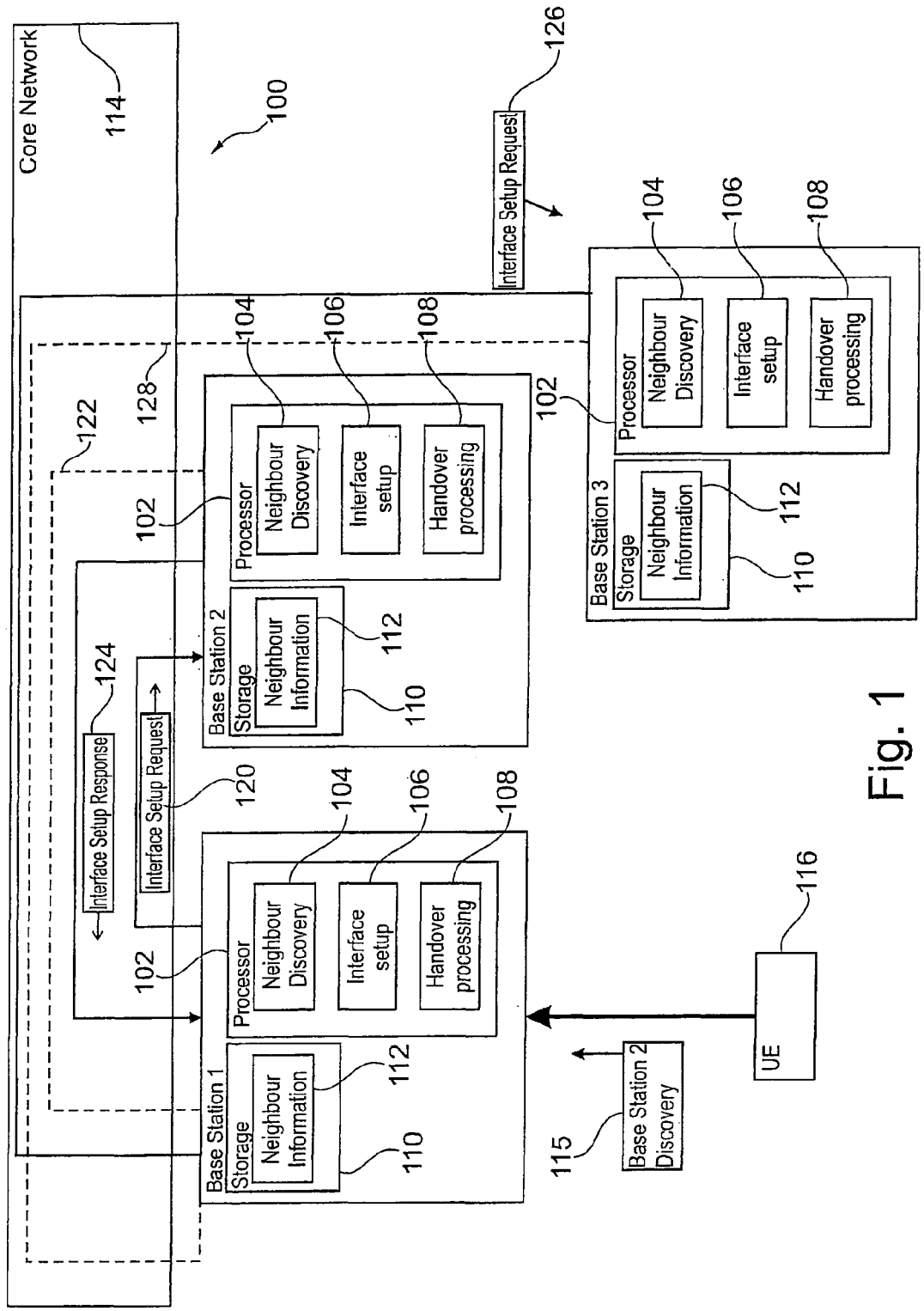
FIG. 1 is a block diagram of an embodiment of base stations and a telecommunication network in accordance with the invention.

FIG. 1 shows a mobile cellular digital telecommunication network 100. The telecommunications network 100 has a number of base stations of which the base stations 1, 2 and 3 are shown in FIG. 1 by way of example.

The base station 1 has at least one processor 102 for execution of program modules 104, 106 and 108. The program module 104 serves for the automatic discovery of base stations that neighbor the base station 1. The program module 106 serves to establish communication links between the base station 1 and base stations that neighbor the base station 1 after such base stations have been discovered. The establishment of such communication links can be implemented by setting up respective X2 interfaces between the base station 1 and the discovered neighboring base stations. The program module 108 serves for handover processing, such as for performing a handover operation from the base station 1 to another neighboring target base station that has been previously discovered.

Further, the base station 1 has a storage component 110 for storing neighbor information 112. The neighbor information 112 is indicative of neighbors that have been discovered by that base station. The neighbor information 112 may be stored as a neighbor relation table in accordance with Section 22.3.2a of the above referenced specification, in particular FIG. 22.3.2a-1.

The base station 2 and the base station 3 have an analogous structure. The base stations 1, 2, 3, . . . of the telecommunications network are linked by a core network 114.

By way of example, a user equipment 116 is shown in FIG. 1. The user equipment 116 is located within a cell that is serviced by the base station 1. By execution of the program module 104 the base station 1 instructs the user equipment 116 to perform measurements on neighbor cells belonging to base station 2. The user equipment 116 has indeed detected the base station 2 but not the base station 3 which is a little more remote from it but still in the neighborhood of base station 1. The user equipment 116 generates a first message 118 that is related to the base station 2. This message 118 contains the cell identifier of the base station 2.

In response to receipt of the message 118 the base station 1 generates a second message 120 by execution of the program module 104. The message 120 is sent from the base station 1 to the newly discovered base station which is the base station 2 in the example considered here. The message 120 is transmitted from the base station 1 to the base station 2 over X2 after the base station 1 has retrieved the IP address of base station 2 e.g. over S1. By means of the message 120 the base station 1 initiates the establishment of a first communication link 122 between itself and the newly discovered base station 2.

In one implementation the communication link 122 is established by setting up an X2 interface between the base station 1 and the newly discovered base station 2. In this instance, the message 120 is implemented as an X2 interface setup request.

In the following it is assumed that base station 2 has previously discovered the base station 3 such that the base station 3 is identified by the neighbor information 112 stored in the storage component 110 of the base station 2. In addition to the base station 3 the neighbor information 112 can identify additional base stations of the telecommunication network 100 that have also been previously discovered by the base station 2.

In response to receipt of the message 120 by the base station 2 to establish the communication link 122, the program module 106 is invoked in the base station 2. The program module 106 generates a third message 124. For generating the message 124 the program module 106 is executed for reading the neighbor information 112 from the storage 110 of the base station 2 that includes information being indicative of the base station 3. For example, the neighbor information 112 comprises the IP address of the base station 3. The IP address of the base station 3 is put into the message 124 by the program module 106 and the message 124 is transmitted from the base station 2 to the base station 1.

In particular, the message 124 can be implemented as an X2 interface setup response that in addition contains the IP address of at least one of the neighboring base stations of the responding base station 2 that are identified by the neighbor information 112 stored in the responding base station 2.

In response to receipt of the message 124 by the base station 1 the program module 106 of the base station 1 is invoked such that the first communication link 122 is set up between the base station 1 and the base station 2. In addition, the message 124 is processed by the program module 104 that reads the IP address of the base station 3 from the message 124 and updates the neighbor information 112 stored in the storage component 110 of the base station 1 in order to reflect the potential neighboring base station 3.

As a consequence of the discovery of the base station 3 in the base station 1 and the update of the related information 112 the program module 104 of the base station 1 causes the generation of a fourth message 126 that is sent from the base station 1 to the newly discovered base station 3. The message 126 is transmitted from the base station 1 to the base station 3 directly over X2 using the received IP address. By means of the message 126 the base station 1 initiates the establishment of a second communication link 128 between itself and the base station 3. The message 126 can be implemented as an X2 interface setup request. In response to the message 126 the communication link 128 is established such as by setting up an additional X2 interface between the base station 1 and the base station 3.

If additional base stations are identified by the neighbor information 112 stored in the storage 110 of the base station 2, such additional base stations can also be identified in the message 124 such that respective additional X2 interfaces can be set up between the base station 1 and any one of such additional base stations.

When the user equipment 116 is moved into the proximity of the base station 3 the program modules 108 of the base station 1 and the base station 3 are invoked for performing handover processing of the user equipment 116 to the target base station 3. As the communication link 128 between the base station 1 and the base station 3 has been established previously the execution of a handover protocol for performing the handover processing can be done via the communication link 128 with a minimal latency time. This has the advantage that the risk of a handover failure is greatly reduced even though the user equipment 116 has not necessarily previously discovered the base station 3 as the base station 3 has been discovered by the base station 1 via the message 124 received from the base station 2.

In accordance with an alternative embodiment the neighbor information 112 does not contain the IP addresses of previously discovered neighboring base stations but the cell identifier and tracking area code of one or more cells of previously discovered base stations. Hence, the message 124 that is generated by the base station 2 does not contain one or more IP addresses of the one or more base stations that neighbor the base station 2 but a cell identifier and a tracking area code for one or more cells of such base station(s) that neighbors the base station 2, in particular the cell identifier and the tracking area code of one or more cells of the base station 3. The base station 1 may use the cell identifier and the tracking area code to obtain the IP address such as for base station 3. This can be done via the core network 114 using the S1 procedure. After the base station 1 has obtained the IP address of the base station 3 the communication link 128 can then be established.

As the base stations 1 and 2 are neighboring and the base stations 2 and 3 are neighboring it is likely that base stations 1 and 3 are also neighboring as a consequence. Hence, the assumption is made that base stations 1 and 3 are neighboring and that the base station 3 is a potential handover target from base station 1. If this should exceptionally not be the case the communication link 128 that has been set up between the base stations 1 and 3 is never used. The base stations may implement a replacement algorithm to replace such unused communication links, such as a time out or an ageing algorithm. For example, setting up to the communication link 128 starts a timer of base station 1. The timer keeps running for as long as no handover is performed from base station 1 to base station 3. If the timer value reaches a maximum, the communication link 128 is dropped, otherwise the communication link 128 is kept alive.

Figure 2:
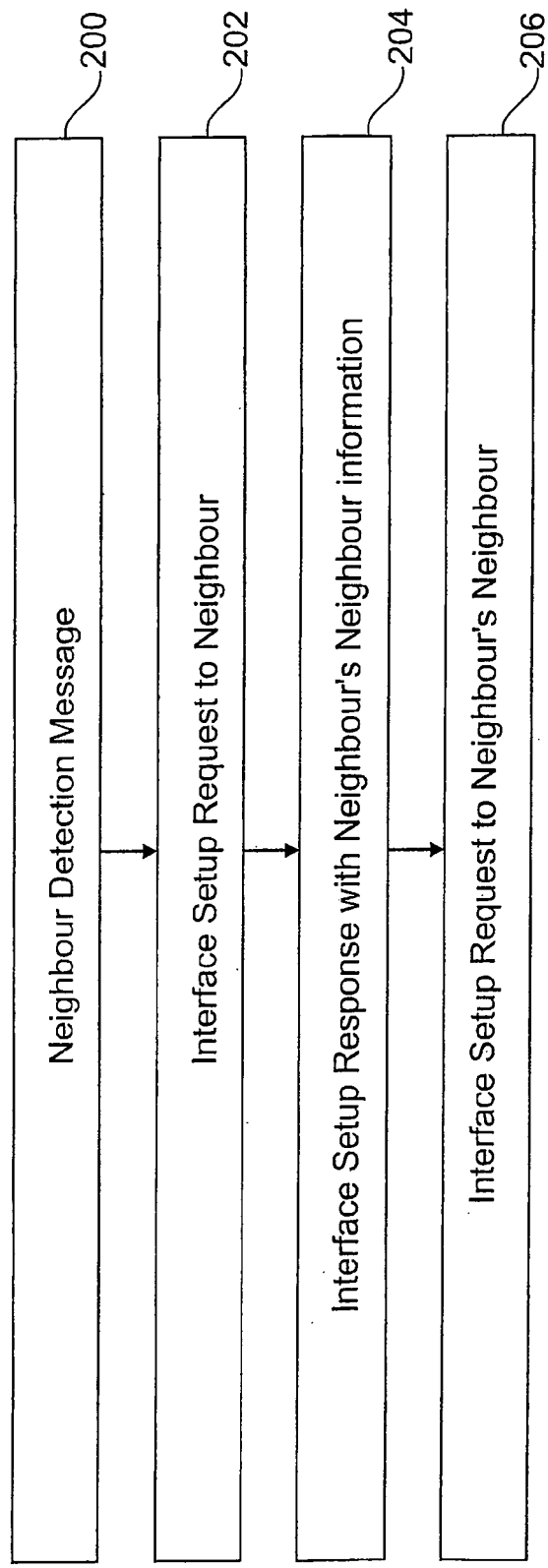
FIG. 2 is a flowchart being illustrative of an embodiment of a method of the invention.

FIG. 2 shows a respective flowchart.

In step 200 a base station, such as base station 1 (cf. FIG. 1), receives a neighbor discovery message from one of the user equipments that is within one cell that is serviced by that base station (cf. user equipment 116 of FIG. 1). In response, after having retrieved the IP address of that neighbor, the base station 1 generates an interface setup request to the newly discovered neighboring base station, such as base station 2. In step 204 the base station 1 receives an interface setup response from its newly discovered neighboring base station 2. The interface setup response contains information being indicative of one or more neighbors that have been previously discovered by the base station 2 as the neighbors of the base station 2 are also direct or indirect neighbors of the base station 1. In step 206 the base station 1 sends interface setup requests to the neighboring base stations of its newly discovered neighbor in order to set up additional interfaces for later handover processing, if needed.

LIST OF REFERENCE NUMERALS

1 Base Station
2 Base Station
3 Base Station
100 Telecommunication network
102 Processor
104 program module
106 program module
108 program module
110 Storage component
112 Neighbor information
114 Core network
116 User equipment
118 Message
120 Message
122 Communication link
124 Message
126 Message
128 Communication link

The invention claimed is:

1. A method of inter base station communication comprising:
    receiving a first message from a user equipment at a first base station, said first message being indicative of a neighboring second base station;
    sending a second message to the second base station;
    in response to the second message, receiving a third message comprising information being indicative of at least a third base station, the third base station being a neighbour of the second base station; and
    using information received with the third message for enabling communication between the first base station and the third base station, wherein the third message comprises a cell identifier and a tracking area code of one or more cells of the third base station.

2. The method of claim 1, wherein the enabling of the communication serves to facilitate a future handover from the first base station to the third base station and/or to exchange interference information between the first and the third base station.

3. The method of claim 1, the second message comprising a request for initiating the establishment of a first communication link, the first communication link being adapted to enable handover communication for performing a handover to the second base station.

4. The method of claim 3, the third message being indicative of an IP address of at least the third base station, and further comprising sending a fourth message for initiating establishment of a second communication link, the second communication link being adapted to enable handover communication for performing a handover to the third base station.

5. The method of claim 3, further comprising using the cell identifier and the tracking area code of one or more cells of the third base station to determine one or more IP addresses to contact that third base station, initiating the establishment of a second communication link using that IP address, the second communication link being adapted to enable handover communication for performing a handover to the third base station.

6. The method of claim 1, further comprising using the cell identifier and the tracking area code received in the third message of one or more cells of the third base station for performing a handover over an S1 interface.

7. The method of claim 4, wherein the first and/or second communication links are established using an X2 interface.

8. The method of claim 1 further comprising:
in response to the third message, sending a fourth message to the third base station to initiate a direct communication link using information received about that third base station in the third message,
and/or in response to the third message, executing a handover towards the third base station over an S1 interface using information received about that third base station in the third message.

9. A non-transitory computer-usable data carrier storing instructions that, when executed by a computer, cause the computer to perform a method comprising:
receiving at a first base station a first message from a user equipment, said first message being indicative of a neighboring second base station;
the first base station sending a second message to the second base station;
in response to the second message, receiving at the first base station a third message comprising information being indicative of at least a third base station, the third base station being a neighbor of the second base station,
using information received with the third message for enabling communication between the first base station and the third base station, wherein the third message comprises a cell identifier and a tracking area code of one or more cells of the third base station.

10. The non-transitory computer-usable data carrier of claim 9, the method further comprising:
in response to the third message, sending a fourth message to the third base station to initiate a direct communication link using information received about that third base station in the third message,
and/or in response to the third message, executing an handover towards the third base station over an S1 interface using information received about that third base station in the third message.

11. A base station for a mobile cellular digital telecommunication network comprising:
a base station discovery component being operable to receive a first message being indicative of a neighboring second base station, send a second message to the second base station, and in response to the second message, receive a third message being indicative of at least a third base station, the third base station being a neighbour of the second base station,
a processing component being operable to use information received with the third message to enable communication between the first base station and the third base station, wherein the third message comprises a cell identifier and a tracking area code of one or more cells of the third base station.

12. The base station of claim 11, wherein the base station discovery component is operable to send a fourth message to establish a communication link to the third base station based on information received in the third message about that third base station.

13. The base station of claim 11, wherein the processing component comprises a handover processing component that is operable to perform the handover to the third base station either over S1 based on information received in the third message or over X2 based on the communication link established in response to the fourth message.

14. A mobile digital cellular telecommunications network comprising a plurality of base stations according to claim 11.

* * * * *